(12) United States Patent
Warnick et al.

(10) Patent No.: US 12,154,598 B1
(45) Date of Patent: Nov. 26, 2024

(54) SYSTEM AND METHOD FOR GENERATING SYNTHETIC VIDEO SEGMENTS DURING VIDEO EDITING

(71) Applicant: UIPCO, LLC, San Antonio, TX (US)

(72) Inventors: Mark Paxman Warnick, San Antonio, TX (US); Ravi Durairaj, San Antonio, TX (US); Joel S. Hartshorn, Port Orchard, WA (US); Nathan Lee Post, Rockport, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 59 days.

(21) Appl. No.: 18/191,160

(22) Filed: Mar. 28, 2023

Related U.S. Application Data

(60) Provisional application No. 63/324,714, filed on Mar. 29, 2022.

(51) Int. Cl.
| | | |
|---|---|---|
| *G06V 10/70* | (2022.01) |
| *G06V 20/40* | (2022.01) |
| *G06V 40/16* | (2022.01) |
| *G11B 27/06* | (2006.01) |
| *G11B 27/34* | (2006.01) |

(52) U.S. Cl.
CPC .............. *G11B 27/06* (2013.01); *G06V 20/49* (2022.01); *G06V 40/161* (2022.01); *G11B 27/34* (2013.01)

(58) Field of Classification Search
CPC ...... G06V 10/70; G06V 20/49; G06V 40/161; G06V 10/00; G06V 40/16; G11B 27/06; G11B 27/34
USPC .......................... 386/278, 280, 287, 239, 248
See application file for complete search history.

(56) References Cited

U.S. PATENT DOCUMENTS

| | | | |
|---|---|---|---|
| 2021/0124996 A1* | 4/2021 | Breugelmans ....... | G06V 10/764 |
| 2021/0326372 A1* | 10/2021 | Ramachandra ........ | G06N 3/006 |
| 2022/0084274 A1* | 3/2022 | Hu ........................ | G06V 40/168 |
| 2023/0112462 A1* | 4/2023 | Li ........................... | G11B 27/28 |
| | | | 386/278 |

* cited by examiner

*Primary Examiner* — Daquan Zhao
(74) *Attorney, Agent, or Firm* — Plumsea Law Group, LLC

(57) ABSTRACT

A system and method for editing videos is disclosed. Specifically, the embodiments provide systems and methods that allow users to generate synthetic video segments that are synchronized with an edited audio track. The system and method make use of autoencoders to modify the facial features, including mouth movements, of a subject.

20 Claims, 10 Drawing Sheets

SYSTEM AND METHOD FOR GENERATING SYNTHETIC VIDEO SEGMENTS DURING VIDEO EDITING

CROSS-REFERENCE TO RELATED APPLICATIONS

This application claims the benefit of Provisional Patent Application No. 63/324,714 filed Mar. 29, 2022, and titled "System and Method for Generating Synthetic Video Segments During Video Editing," which is incorporated by reference herein in its entirety.

TECHNICAL FIELD

The present disclosure generally relates to machine learning, and in particular to processing videos with machine learning.

BACKGROUND

Video editing is an important part of preparing a video to be shown to an audience. The editing process often includes editing both the video itself, as well as one or more accompanying audio tracks. Many content creators, for example, make and edit videos that feature reviews of products, songs, or other content. During the editing process, the content creators may choose to remove segments of the audio track, for example, to delete filler words or inaudible content. Many existing tools can be used to splice the audio track at different points and merge spliced segments together, to create a seamless audio experience for the viewer of the content. However, current video editing software lacks corresponding tools for seamlessly merging video segments together, instead relying on conventional transitions such as cross-fading.

There is a need in the art for a system and method that addresses the shortcomings discussed above.

SUMMARY

In one aspect, a method of generating synthetic video segments for use in editing videos includes steps of receiving a video clip comprised of a continuous video recording of a subject that is speaking, the video clip including a first timestamp and a second timestamp, where the first timestamp and the second timestamp define a segment of the video clip to be edited and segmenting the video clip into a first video segment, a second video segment, and a third video segment according to the first timestamp and the second timestamp, where the second video segment is the segment of the video clip to be edited. The method further includes steps of using facial detection to extract a first set of facial images from the second video segment, using facial detection extract a second set of facial images from the third video segment, training a first autoencoder, comprised of a shared encoder and a first decoder, using the first set of facial images extracted from the second video segment, and training a second autoencoder, comprised of the shared encoder and a second decoder, using the second set of facial images extracted from the third video segment. The method also includes generating a set of synthetic facial images by feeding the second set of facial images into the first autoencoder and superimposing the set of synthetic facial images onto images extracted from the second video segment to generate a synthetic video segment.

In another aspect, a non-transitory computer-readable medium storing software comprising instructions executable by one or more computers which, upon such execution, causes the one or more computers to receive a video clip comprised of a continuous video recording of a subject that is speaking, the video clip including a first timestamp and a second timestamp, where the first timestamp and the second timestamp define a segment of the video clip to be edited and segment the video clip into a first video segment, a second video segment, and a third video segment according to the first timestamp and the second timestamp, where the second video segment is the segment of the video clip to be edited. The instructions also cause the one or more computers to use facial recognition to identify and extract a first set of facial images from the second video segment, use facial detection to extract a second set of facial images from the third video segment, train a first autoencoder, comprised of a shared encoder and a first decoder, using the first set of facial images extracted from the second video segment, train a second autoencoder, comprised of the shared encoder and a second decoder, using the second set of facial images extracted from the third video segment, generate a set of synthetic facial images by feeding the second set of facial images into the first autoencoder, and superimpose the set of synthetic facial images onto images extracted from the second video segment to generate a synthetic video segment.

In another aspect, a system for generating synthetic video segments for use in editing videos includes a device processor and a non-transitory computer readable medium storing instructions. The instructions are executable by the device processor to receive a video clip comprised of a continuous video recording of a subject that is speaking, the video clip including a first timestamp and a second timestamp, where the first timestamp and the second timestamp define a segment of the video clip to be edited and segment the video clip into a first video segment, a second video segment, and a third video segment according to the first timestamp and the second timestamp, where the second video segment is the segment of the video clip to be edited. The instructions are also executable to use facial recognition to identify and extract a first set of facial images from the second video segment, use facial recognition to identify and extract a second set of facial images from the third video segment, train a first autoencoder, comprised of a shared encoder and a first decoder, using the first set of facial images extracted from the second video segment, train a second autoencoder, comprised of the shared encoder and a second decoder, using the second set of facial images extracted from the third video segment, generate a set of synthetic facial images by feeding the second set of facial images into the first autoencoder, and superimpose the set of synthetic facial images onto images extracted from the second video segment to generate a synthetic video segment.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

The embodiments provide systems and methods for editing videos. Specifically, the embodiments provide systems and methods that allow users to generate synthetic video segments that are synchronized with an edited audio track.

As used herein, the term "video clip" refers to a sequence of images (also referred to as frames). This sequence of images may be stored in digital memory on a computing device and/or on a separate memory device, and thereby copied, modified, or deleted, by a computing device comprising at least a processor. The term "audio clip" refers to a sequence of sounds. This sequence of sounds may be stored in digital memory of some kind and thereby copied, modified, or deleted, by a computing device comprising at least a processor.

As used herein, a video clip and corresponding audio clip (or track) are said to be "synchronized" when the sounds of the audio clip match what is happening within the video clip (and vice versa). As a specific example, a video of a user speaking may be synchronized with a corresponding audio clip of the user speaking when the timing of the speech matches the timing of the user's mouth movements in the video.

Figure 1:
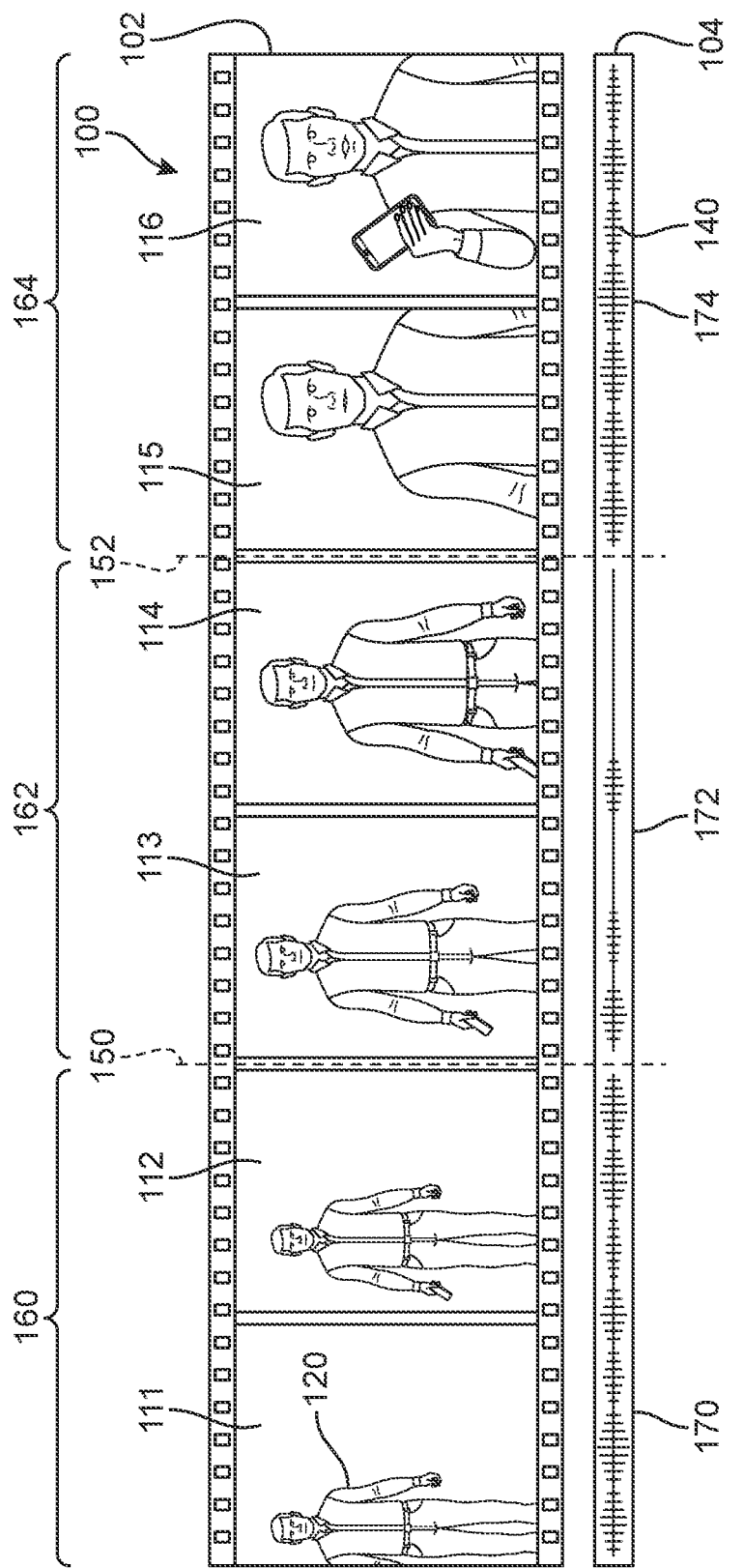
FIG. 1 is a schematic view of media content including a video clip and a corresponding audio clip, according to an embodiment.

As an example, FIG. 1 shows multimedia content 100, which is further comprised of a video clip 102 and a corresponding audio clip 104. In this case, video clip 102 and audio clip 104 are synchronized, as the content has been recorded using a smart phone that can capture video and audio simultaneously.

Video clip 102 is further comprised of a sequence of images, or frames, including first image 111, second image 112, third image 113, fourth image 114, fifth image 115, and sixth image 116. Taken together, this sequence of images shows a content creator 120 moving across a room towards a camera (not shown), while talking and holding a smartphone 130. The scene shown in video clip 102 is comprised of only six frames in order to better illustrate the methods described herein, but in other situations a video clip can comprise any suitable number of frames.

Audio clip 104 is comprised of a substantially continuous audio signal 140, which encodes the speech 142 (and pauses in speech) of subject 120. In this example, speech 142 includes the following sequence of words: "So today we are going to be, um . . . um . . . uh . . . , talking about this new phone."

When multimedia content 100 is played, a viewer would see subject 120 moving around and speaking. In this example, subject 120 moves towards the camera as he speaks, so that he takes up more of the frame over time. Moreover, because the video and audio are synchronized, the words spoken by the subject match the movements of the content subject's mouth as they move around.

For many types of multimedia content, it is important to provide seamless audio for the viewer. Because of this, content creators may prefer to remove unwanted audio, such as pause fillers like "um" and "uh."

The simplest way to edit out portions of audio is to cut out segments of the audio clip along with corresponding segments of the video. This ensures that the video and audio will remain synchronized after the undesired audio segments have been removed.

In FIG. 1, a user may indicate, using suitable video editing software, a segment of multimedia content 100 to delete. These can be done using, for example, frame markers or timestamps. In FIG. 1, a first timestamp 150 and a second timestamp 152 can be used to divide the video and audio clips into distinct segments. In this case, video clip 102 may be divided into a first video segment 160, a second video segment 162, and a third video segment 164. Likewise, using the same timestamps, audio clip 104 may be divided into a first audio segment 170, a second audio segment 172, and a third audio segment 174. As seen in FIG. 1, first video segment 160 corresponds to first audio segment 170, second video segment 162 corresponds to second audio segment 172, and third video segment 164 corresponds to third audio segment 174.

In one example, a user may choose to delete the portion of multimedia content 100 in which the content creator uses awkward pause fillers, including "um" and "uh", which occur in second audio segment 172. To ensure that the video and audio remain synchronized after deletion, the corresponding second video segment 162, in which the user can be seen moving his mouth to make the "um" and "uh" sounds, is deleted simultaneously with the second audio segment 172.

Figure 2:
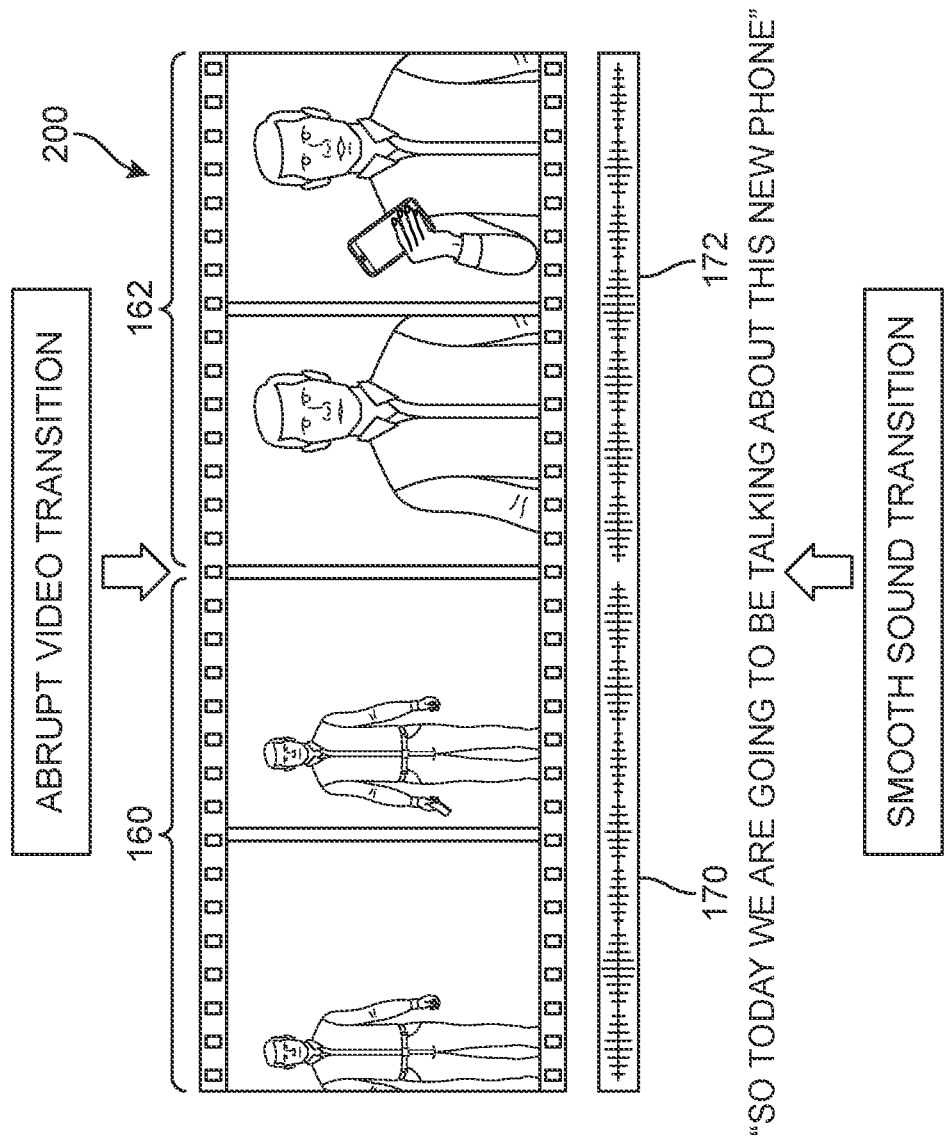
FIG. 2 is a schematic view of edited media content, according to an embodiment.

The resulting edited multimedia content 200 is shown in FIG. 2 and includes an edited video clip comprised of first video segment 160 and third video segment 164, as well as a corresponding edited audio clip comprised of first audio segment 170 and third audio segment 174. The resulting content provides a smoother audio track, in which the awkward pause fillers have been removed. However, because the subject moved around during the video, editing the multimedia content in this way has created an abrupt video transition in which the subject suddenly jumps to a much closer location in the frame. This occurs because the deleted video content (corresponding to the deleted audio content) contained the intermediate sequence of movement. Of course, if the content were edited to remove only the second audio segment 172, the resulting audio clip would not be synchronized with the video clip after a particular time in the video (namely, after first timestamp 150).

The embodiments provide a technical solution to this problem by implementing a system and method for generating synthetic video segments that match the edited audio clip. This is accomplished using machine learning, and in particular, an architecture of autoencoders that can be trained and used to generate the necessary synthetic video to match the edited audio clip.

Figure 3:
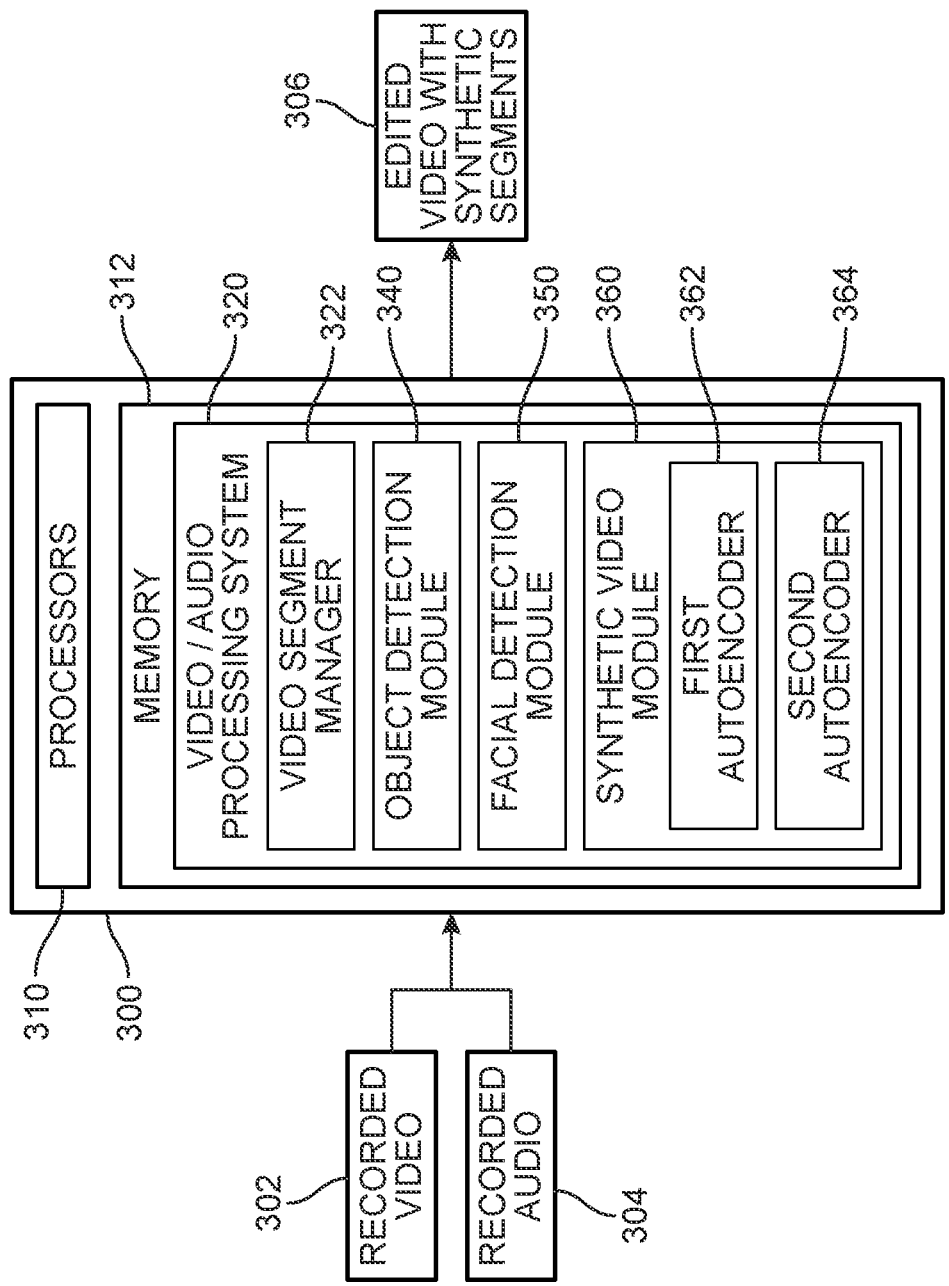
FIG. 3 is a schematic view of a computing system for generating synthetic video, according to an embodiment.

FIG. 3 is a schematic view of a computing system 300 that may be used to edit recorded video 302 and recorded audio 304 and generated an edited video with synthetic segments (output 306). Computing system 300 may comprise any kind of computing device, such as a desktop computer, a laptop computer, a tablet computer, a smart phone, or any other suitable computing device. Computing system 300 may comprise one or more processors 310 and memory 312 suitable to store instructions that can be executed by processors 310.

Computing device 300 may store, in memory 312, a video/audio processing system 320 ("processing system 320"). In some cases, such a system could comprise video editing software, which includes tools for editing video clips and audio clips simultaneously. In some embodiments, the video editing software comprises a user interface allowing users to import video/audio clips, edit the clips, and export the clips so that they can be viewed on other devices. Thus, processing system 320 may include a video segment manager 322 for managing video and audio clips and segments. As used herein, a video segment refers to a portion of a video clip, and may be defined using timestamps for the video clip. Similarly, an audio segment refers to a portion of an audio clip, and may be defined using timestamps for the audio clip.

Video segment manager 322 includes tools for importing, editing, and exporting video and/or audio clips. As part of the editing process, video segment manager 322 can be used to splice video and/or audio clips into distinct segments, which may then be copied, deleted, and/or merged together in any suitable sequence.

Processing system 320 may also include modules that facilitate generating synthetic video segments. Processing system 320 may include various machine learning systems, such as an object detection module 340, a facial detection module 350, and a synthetic video module 360.

Object detection module 340 may be used to detect people in videos. Any suitable object detection algorithms known in the art could be used. In some embodiments, object detection could be implemented with neural networks.

Facial detection module 350 may be used to identify faces in videos. Any suitable facial detection algorithms known in the art could be used. In some cases, facial detection may be applied after object detection has been applied. This ensures that the system does not accidentally detect a face when there is no person in the image.

In some cases, facial detection module 350 may also include facial identification (or recognition) algorithms. Any suitable facial recognition algorithms known in the art could be used. Facial recognition may be useful when there are multiple faces in the same image.

Synthetic video module 360 may comprise a plurality of machine learning components arranged in an architecture that facilitates learning representations of a person detected in a video and using those representations to generate synthetic video segments showing the person saying different words than those captured when the video segment was originally recorded.

As part of this architecture, synthetic video module 360 may further include a first autoencoder 362 and a second autoencoder 364. Each autoencoder can be implemented on computing system 300. In some cases, as described in further detail below, the autoencoders are comprised of neural networks.

Figure 4:
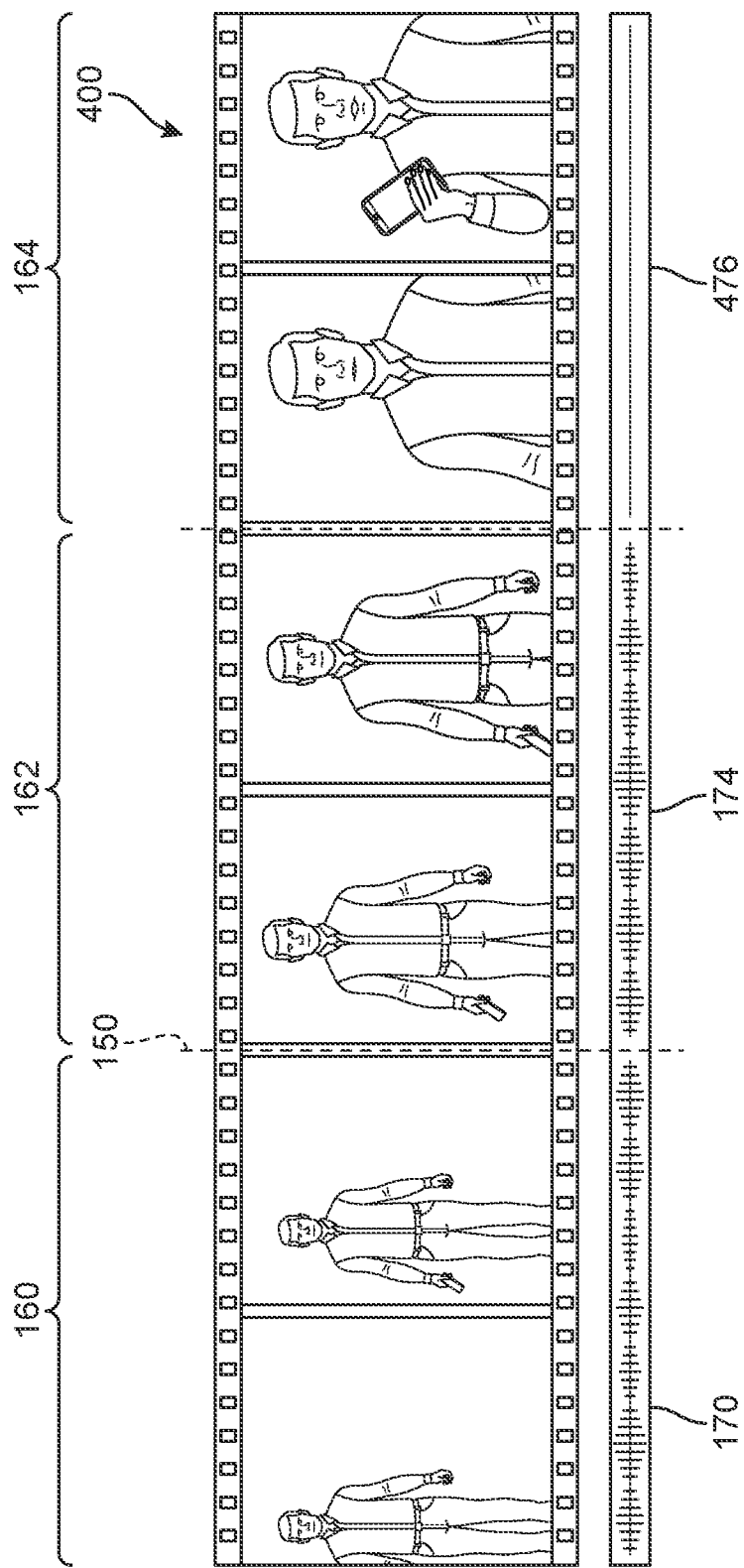
FIG. 4 is a schematic view of edited media content, according to an embodiment.

FIG. 4 is a schematic view of an edited multimedia clip 400 after the unwanted audio segment from multimedia content 100 in FIG. 1 (second audio segment 162) has been removed. For convenience in the editing process, a new fourth audio segment 476 has been added, and corresponds to audio accompanying third video segment 164. In this case, fourth audio segment 476 does not include any spoken words, but could be filled with ambient noise to match the background noise in previous audio segments. As seen in FIG. 4, although the audio clip has been edited to provide smoother audio, the audio and video clips are no longer synchronized after first timestamp 150. For example, the subject's mouth movements in second video segment 162 do not match the spoken words of third audio segment 174 (which now plays simultaneously with second video segment 162). Also, the subject's mouth moves in third video segment 164 even though there are no spoken words in fourth audio segment 476 (which plays simultaneously with third video segment 164).

To have synchronized audio and video, it may be necessary to synthetically recreate the segment of video corresponding to second video segment 162 and third video segment 164. That is, using the exemplary system of FIG. 3, as well as methods described in further detail below, the embodiments can be used to create a new synthetic video segment in which the content creator appears to be speaking the words associated with the edited audio clip. As discussed below, this may be achieved using machine learning to generate new images (or frames) in which the user's facial expressions (including the movements of their mouth) match the words of the corresponding audio clip (as in third audio segment 174). This same process can also be used to show the user's mouth as static when there are no words spoken in the corresponding audio clip (as in fourth audio segment 476).

Figure 5:
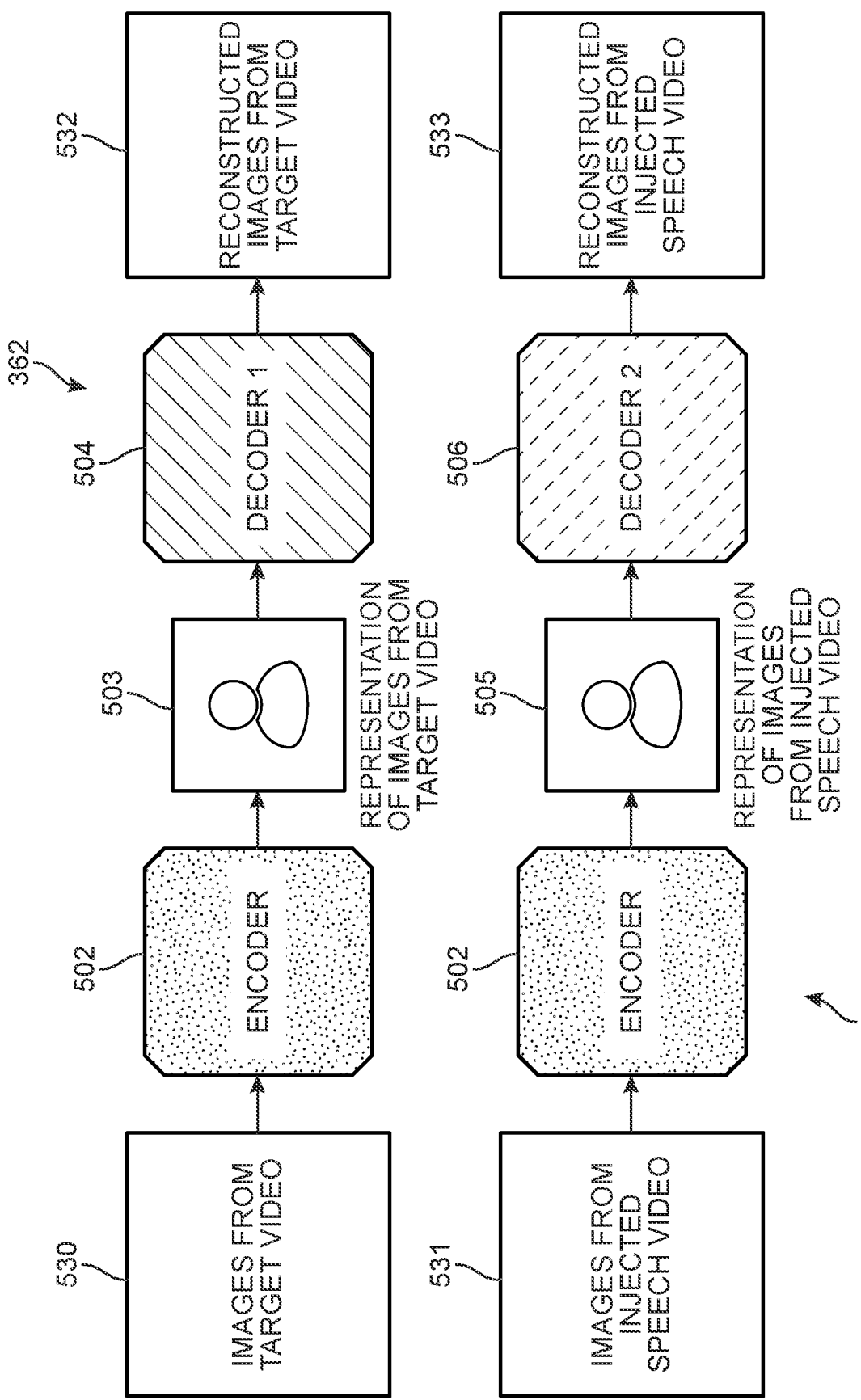
FIG. 5 is a schematic view of a machine learning architecture comprised of two autoencoders, according to an embodiment.

FIG. 5 is a schematic view of a possible architecture for autoencoders incorporated into synthetic video module 360. Each autoencoder can comprise an encoder, a decoder, and a bottleneck. The encoder is trained to learn a compact representation of an image, including images of faces. The compact representation is then stored in a bottleneck. A decoder is trained to reconstruct an image, including images of faces, from the representation stored in the bottleneck.

In this exemplary configuration, first autoencoder 362 is further comprised of a shared encoder 502 and a first decoder 504, as well as a first autoencoder bottleneck 503, which is used to store the output of shared encoder 502. Second encoder 364 is further comprised of the same shared encoder 502 and a second decoder 506, as well as a second autoencoder bottleneck 505. It may be understood that shared encoder 502 is trained using a common set of data, whereas first decoder 504 and second decoder 506 are trained using different data sets, as described in further detail below.

Shared encoder 502 receives input images and outputs representations of those images, which can be stored in a bottleneck (such as first autoencoder bottleneck 503 or second autoencoder bottleneck 505). These representations generally comprise lower dimensional representations of the original images, and thus comprise a kind of compression of the input data.

Each decoder receives the representations stored in a bottleneck and reconstructs a new image from that compressed data.

Each autoencoder may be trained using a reconstruction loss method that measures differences between the input images (received at the encoder) and the output images (generated by the decoders). Using such a method, the components of the autoencoders can all be trained so that the differences in input and output images are minimized, thereby allowing the system to learn meaningful representations of the original images, which are lower dimensional and therefore in some ways capture broader features of the image than a pixel-by-pixel representation.

Moreover, in the exemplary architecture, using a shared encoder makes it possible for the two autoencoders to learn shared characteristics of the images. For example, by training shared encoder 502 on all of the input images, the encoder can learn general features that are common to different faces (or to the same faces in different orientations, sizes, and expressions).

Autoencoders can be implemented, for example, using neural networks, such as Feed Forward networks, Long-Short Term Memory networks, Convolutional Neural Networks, or other suitable deep neural networks. As an example, a simple Feed Forward deep neural network can be used to implement an encoder, a bottleneck, and a decoder as a single network, with each component comprising one or more layers of the network (and with the bottleneck generally including fewer nodes than input and output layers to ensure suitable compression at the bottleneck).

The exemplary architecture of FIG. 5 can be used to create synthetic video segments that change the how a subject's mouth (and other facial features) move over a sequence of frames. This can be done so the subject appears to say words at that he or she did not speak at a particular time in the original recording. Referring to the example of FIG. 1, the synthetic video segment may show the subject saying the words "talking about this new device" as they are walking towards the camera, whereas in the originally recorded clip, the subject is saying filler words ("um" and "uh") as they walked towards the camera.

In the exemplary system, each autoencoder is trained using different sets of images. These different sets of images correspond to different segments or portions of the video clip. For convenience, the embodiments refer to an "injected speech video segment" and a "target video segment," where each video segment is taken from an unedited video clip. The injected speech video segment corresponds to a portion of the video in which the person on the video says the words (the "injected speech") that will accompany the final synthetic video segment. By contrast, the target video segment is the portion of video where the injected speech is to be inserted. Then the final synthetic video segment shows the person as they appear in the target video segment, but with their facial features (including mouth movements) modified to match the injected speech.

Using examples from FIG. 1, third audio segment 174 is the injected speech. Third video segment 164 is the injected speech video segment, in which the subject's facial movements match the injected speed ("talking about this new phone"). Additionally, the target video segment is comprised of second video segment 162. Thus, the intention is for the system to generate a synthetic video segment showing the user walking closer to the camera, as in second video segment 162, while moving their mouth in synchronization with third audio segment 174 (the injected speech).

The data sets for the autoencoders are taken from the injected speech video segment and from the target video segment. As seen in FIG. 5, first autoencoder 362 is trained using images from the target video segment (first input 530).

Training proceeds by feeding these images and updating the associated machine learning parameters (for example, feed forward neural network weights) of shared encoder 502 and first decoder 504 using a suitable reconstruction loss function, until first output 532 of first autoencoder 362 is sufficiently similar to the input images (first input 530). Likewise, second autoencoder 264 is trained using images from the injected speech video segment (second input 531). Training proceeds by feeding these images and updating the associated machine learning parameters (for example, feed forward neural network weights) of shared encoder 502 and second decoder 506 using a suitable reconstruction loss function, until second output 533 of second autoencoder 364 is sufficiently similar to the input images (second input 531).

Figure 6:
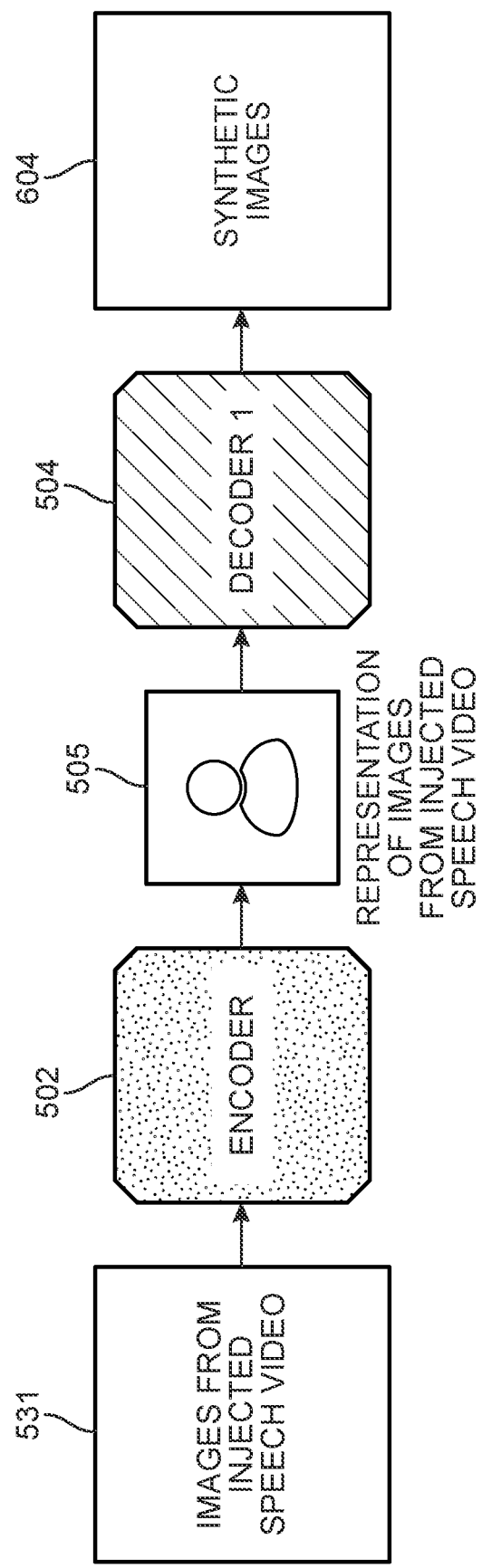
FIG. 6 is a schematic view of using a trained encoder and a trained decoder that are used to generate synthetic images, according to an embodiment.

Once the autoencoders have been trained on input images, a set of synthetic images can be generated as follows. Referring to FIG. 6, images from the injected speech video segment are encoded using shared encoder 502, which generates an associated representation 505 stored in a bottleneck. However, rather than using second decoder 506 to reconstruct these images, as was done during the training phase (FIG. 5), the method uses first decoder 504 to reconstruct a set of synthetic images 604. These synthetic images comprise frames of a video segment that show the target video segment, but with the subject's facial features replaced with features matching the injected speech.

Figure 7:
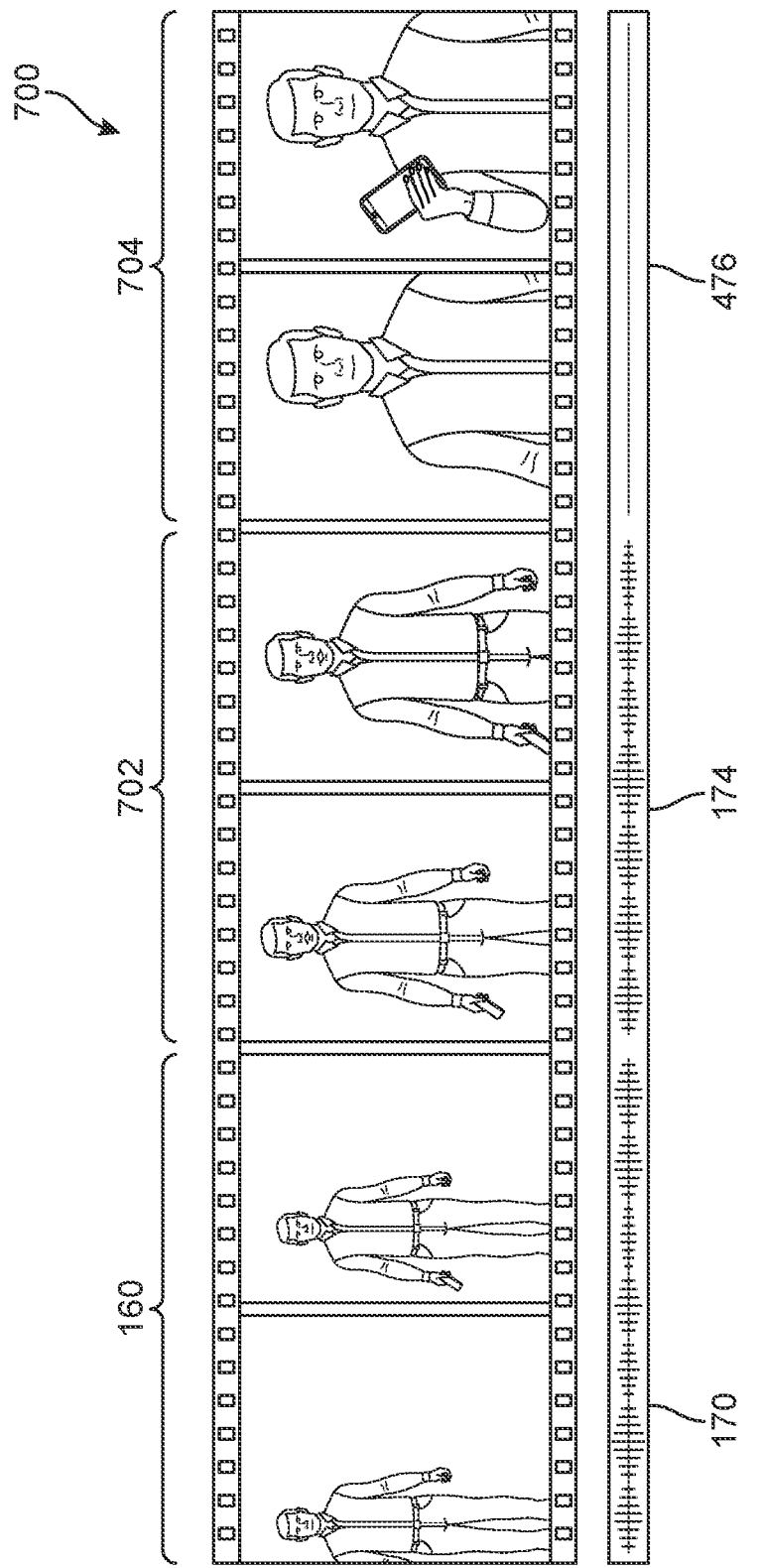
FIG. 7 is a schematic view of an edited video clip including synthetic video, according to an embodiment.

FIG. 7 is a schematic view of an edited video clip 700 with synthetic video segments generated according to the embodiments. In this example, clip 700 includes the original first video segment 160 that is already synchronized with the first audio segment 170. Additionally, a first synthetic video segment 702 shows a similar video sequence to second video segment 162, but with synthetically generated facial (and mouth) movements synchronized with the third audio segment 174.

Moreover, a second synthetic video segment 704 has been created using a similar method. Second synthetic video segment 704 shows a similar video sequence to third video segment 164, but with synthetically generated facial movements synchronized with the fourth audio segment 476. In particular, whereas the subject's mouth was moving in synchronization with the third audio segment 174 in the original video clip, in the edited video clip the subject's mouth is no longer moving as there is no speech in the new fourth audio segment 476.

Figure 8:
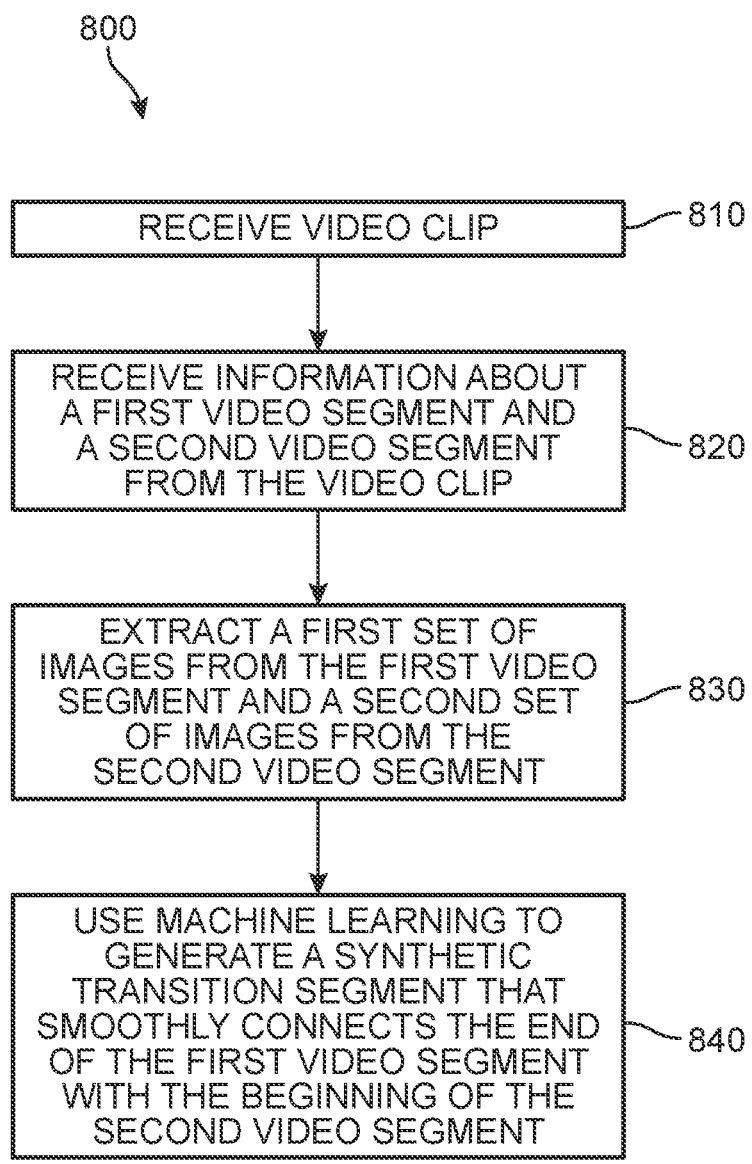
FIG. 8 is a schematic view of a process for generating synthetic video, according to an embodiment.

FIG. 8 is a schematic view of a general method 800 of using machine learning to create smooth transitions between video segments that do not show continuous movement of a subject. As an example, if a video is edited to remove a portion of video between a first video segment and a second video segment, the subject may appear to jump between two positions instantaneously as the edited video clip is played.

Starting at step 810, a system for creating smooth transitions with machine learning may first receive a video clip. In addition, in some cases, the system can receive information about two different video segments in step 820. These may be defined by timestamps, for example.

In step 830, the system can extract first and second sets of images, respectively, from the first video segment and from the second video segment. Here, it may be appreciated that the two video segments are disjoint, such that some intermediate portion of the video between the two video segments has been removed.

In step 840, the system can use machine learning to generate a synthetic transition segment that smoothly connects the first video segment with the beginning of the second video segment. For example, if a user was located at a first position within the (fixed) camera view at the end of the first video segment, and then jumped to a second position within the camera view at the beginning of the second video segment, the embodiments could generate a synthetic transition video segment that shows the user moving between the two locations. Then, the synthetic transition video segment could be inserted in between the first video segment and the second video segment to create show continuous motion for the subject.

In some cases, during step 840, the embodiments could include provisions for automatically adapting the facial and mouth movements that would be synchronized with the video.

Figure 9:
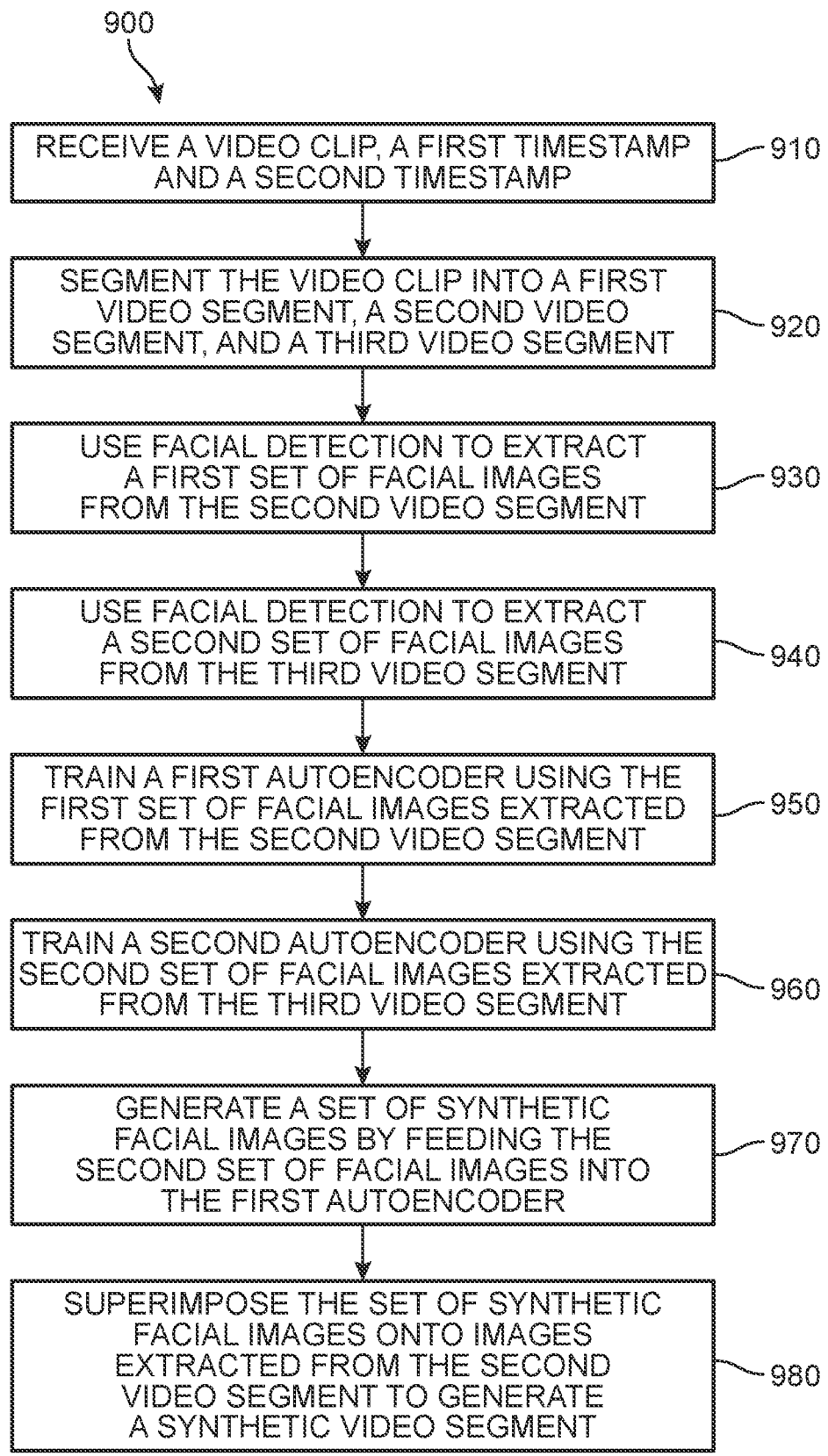
FIG. 9 is a schematic view of another process for generating synthetic video, according to an embodiment.

FIG. 9 is a schematic view of a process 900 showing steps for generating synthetic video as discussed above and shown in FIGS. 5-7. In some embodiments, one or more of the following steps could be performed by a synthetic video module (such as synthetic video module 360 ("module 360")).

Starting in step 910, module 360 may receive a video clip, a first timestamp and a second timestamp.

Next, in step 920, module 360 may segment the video clip into a first video segment, a second video segment, and a third video segment according to the timestamps. That is, first video segment may comprise the portion of video between the beginning of the video clip and the first timestamp, the second video segment may comprise the portion of video between the first timestamp and the second timestamp, and the third video segment may comprise the portion of video between the second timestamp and the end of the video clip.

In this example it may be understood that the second video segment corresponds to an audio segment that is to be (or has been) deleted from the multimedia file (which includes both the video and corresponding audio). Also, the third video segment corresponds to an audio segment that will, after the deletion, play during the second video segment.

In step 930, module 360, possibly in coordination with other modules (such as object detection module 340 and/or facial detection module 350) may use facial detection to detect and extract a first set of facial images from the second video segment. Likewise, in step 940, module 360 may use facial detection to detect and extract a second set of facial images from the third video segment.

In step 950, module 360 trains a first autoencoder using the first set of facial images extracted from the second video segment. Likewise, in step 960, module 360 trains a second autoencoder using the second set of facial images extracted from the third video segment.

Next, in step 970, the second set of facial images (corresponding to the speech injection video segment) are fed into the trained first autoencoder to generate a set of synthetic facial images. These synthetic facial images are very similar to the facial images from the original second video segment, but with different mouth movements, for example, that show the subject saying the words originally associated with the third video segment.

To complete the creation of the synthetic video segment, the synthetic facial images are superimposed onto the extracted images from the second video segment, and sequenced together to create a segment of synthetic video.

The exemplary autoencoding architecture to generate synthetic video segments may work subject to various criteria. For example, it may be difficult to generate accurately reconstructed faces from partial views (such as when a subject turns their face away from the camera). In some embodiments, a synthetic video module can include provisions to handle portions of a video that are not easily amendable to autoencoding. For example, a module could identify problematic portions (which could last for only a small number of frames in some cases), and automatically use a de-focusing or blurring effect on the identified portion (s) of video. Applying defocusing or blurring, especially for small durations of time, creates an aesthetically interesting effect that also hides both the subject's facial movements, and also possibly hides small movements of the subject's body.

Figure 10:
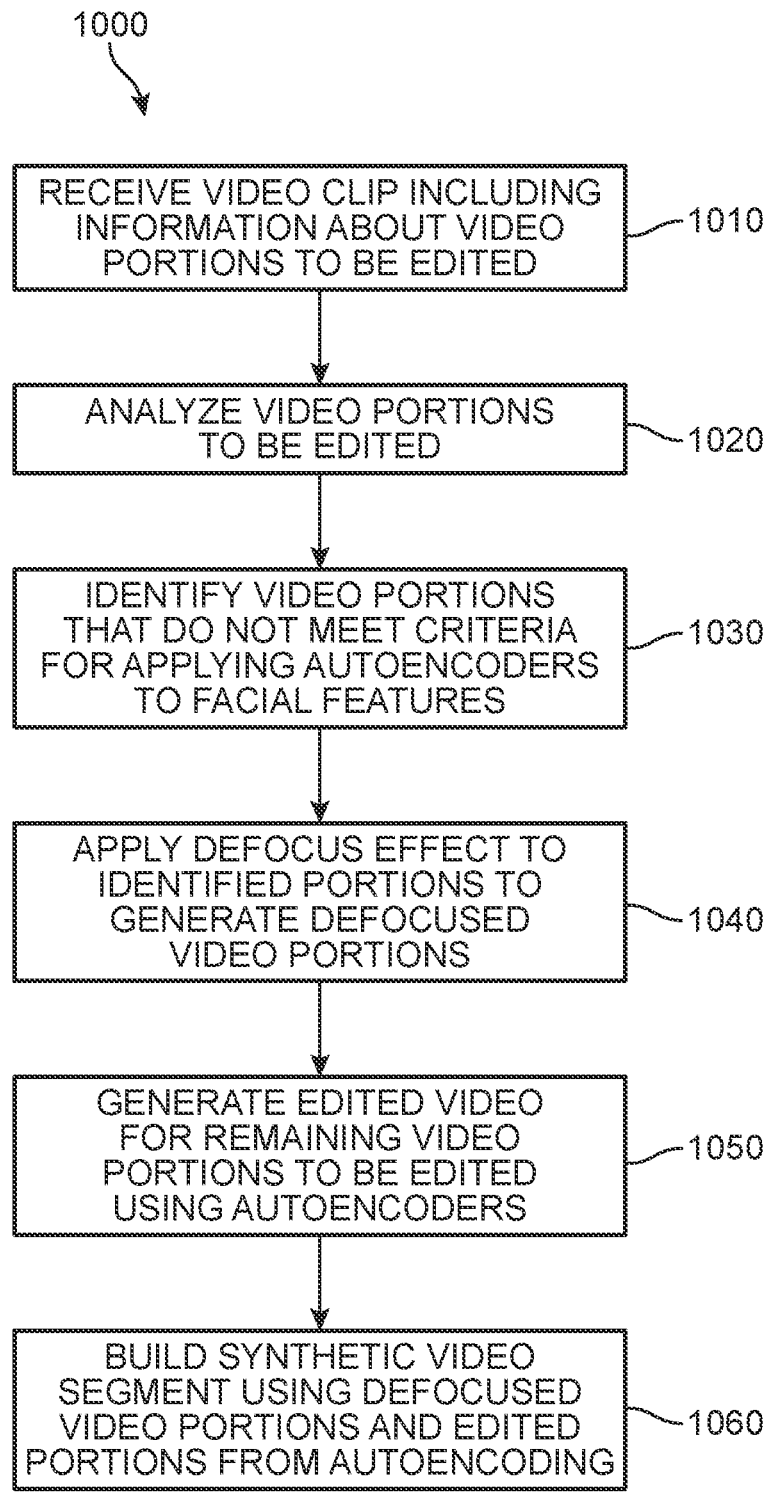
FIG. 10 is a schematic view of a process for editing video, according to an embodiment.

FIG. 10 is a schematic view of an exemplary method 1000 for building synthetic video segments that combine video generated using autoencoding and segments using defocusing.

In step 1010, module 360 could receive a video clip including information about portions of the video that may need to be edited to accommodate edits to the associated audio clips.

In step 1020, module 360 may analyze the video portions to be edited. In some cases, the analysis could use a facial detection algorithm that determines which frames have suitably detected faces, and which frames have partial or no faces detected. In step 1030, module 360 identifies, based on the analysis of step 1020, video portions that do not meet the criteria for applying autoencoders to facial features. As an example, module 360 could identify portions where a subject's face is turned away from the camera and therefore not visible.

In step 1040, module 360 may apply defocus effects to the identified portions to generate defocused video portions. That is, the individual images of the identified video portion could be defocused.

In step 1050, module 360 may generate edited video for the remaining video portions that can be processed using autoencoders. That is, if a video clip includes one portion that is not amenable to autoencoding, the system applies defocusing to that portion in step 1040 and then generates a new video clip with that portion removed. The new video clip can then be processed using autoencoding according to the method described above. Once the remaining portions of video have been processed using autoencoding, the resulting synthetic video portions can then be merged with the defocused video portions to build a complete synthetic video segment.

The resulting segment would show the subject's facial features (including mouth movements) matching the edited audio segments, and may include some portions where the video defocusses for a brief time as a transitional effect between segments that are not amenable to autoencoding.

Alternatively, in some cases, a system could generate synthetic B-roll video segments that could be inserted between frames where audio has been deleted and where autoencoding cannot be used. The synthetic B-roll video segments can be automatically constructed using machine learning based on input images of the environment captured during the video clip.

In some embodiments, the process of generating synthetic videos can further include altering the apparent speed of motion of a subject in a video segment. In some embodiments, prior to injecting speech into a target video segment, the target video segment could be slowed down (for example, by adding additional frames) or sped up (for example, by removing frames). This could be used to control how long the target video segment lasts, so that the synthetic video segment can be as long or short as needed for the edited video clip.

The embodiments can include provisions for automating earlier steps of editing, including editing out sounds of a recording. For example, rather than having a user manually edit a sound clip and then using the associated time stamps to facilitate the process described above, a system can be configured to automatically remove audio. For example, a system could automatically detect certain undesired words that are stored in memory, such as "uh," "umm," or other kinds of filler words. Likewise, the system could detect unwanted noises, including noises that are too loud, too high pitched, or otherwise undesirable. Parameters for these unwanted noises can be stored in memory. Upon receiving a new video clip and corresponding audio clip, the system could automatically detect any undesirable words or noises in the audio clip. These portions of the clip associated with these noises or words can then be deleted. The time stamps associated with the deleted audio content can then be provided, along with the raw video, to the exemplary system described above in order to generate synthetic video that matches the automatically edited audio.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

For each of the exemplary processes described above including multiple steps, it may be understood that other embodiments some steps may be omitted and/or reordered. In some other embodiments, additional steps could also be possible.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A method of generating synthetic video segments for use in editing videos, comprising:
receiving a video clip comprised of a continuous video recording of a subject that is speaking, the video clip including a first timestamp and a second timestamp, wherein the first timestamp and the second timestamp define a segment of the video clip to be edited;
segmenting the video clip into a first video segment, a second video segment, and a third video segment according to the first timestamp and the second timestamp, wherein the second video segment is the segment of the video clip to be edited;
using facial detection to extract a first set of facial images from the second video segment;
using facial detection extract a second set of facial images from the third video segment;
training a first autoencoder, comprised of a shared encoder and a first decoder, using the first set of facial images extracted from the second video segment;
training a second autoencoder, comprised of the shared encoder and a second decoder, using the second set of facial images extracted from the third video segment;
generating a set of synthetic facial images by feeding the second set of facial images into the first autoencoder; and
superimposing the set of synthetic facial images onto images extracted from the second video segment to generate a synthetic video segment.

2. The method according to claim 1, wherein the method further includes identifying images within the second video segment that cannot be used to generated synthetic facial images and applying a defocused effect to the identified video portions.

3. The method according to claim 1, wherein the method further includes creating a modified second video segment, wherein the modified second video segment is comprised of fewer images than the second video segment.

4. The method according to claim 1, wherein the first autoencoder and the second autoencoder are Feed Forward neural networks.

5. The method according to claim 1, wherein the first autoencoder and the second autoencoder are Long-Short Term Memory neural networks.

6. The method according to claim 1, wherein the first autoencoder and the second autoencoder are Convolutional neural networks.

7. The method according to claim 1, wherein the shared encoder is trained using the first set of facial images and the second set of facial images.

8. The method according to claim 1, wherein the video clip corresponds to a synchronized audio clip, and wherein the synthetic video segment shows a user speaking in synchronization with a portion of the audio clip.

9. A non-transitory computer-readable medium storing software comprising instructions executable by one or more computers which, upon such execution, cause the one or more computers to:
- receive a video clip comprised of a continuous video recording of a subject that is speaking, the video clip including a first timestamp and a second timestamp, wherein the first timestamp and the second timestamp define a segment of the video clip to be edited;
- segment the video clip into a first video segment, a second video segment, and a third video segment according to the first timestamp and the second timestamp, wherein the second video segment is the segment of the video clip to be edited;
- use facial recognition to identify and extract a first set of facial images from the second video segment;
- use facial detection to extract a second set of facial images from the third video segment;
- train a first autoencoder, comprised of a shared encoder and a first decoder, using the first set of facial images extracted from the second video segment;
- train a second autoencoder, comprised of the shared encoder and a second decoder, using the second set of facial images extracted from the third video segment;
- generate a set of synthetic facial images by feeding the second set of facial images into the first autoencoder; and
- superimpose the set of synthetic facial images onto images extracted from the second video segment to generate a synthetic video segment.

10. The non-transitory computer-readable medium according to claim 9, wherein the instructions are executable by the one or more computers to identify images within the second video segment that cannot be used to generated synthetic facial images and applying a defocused effect to the identified video portions.

11. The non-transitory computer-readable medium according to claim 9, wherein the instructions are executable by the one or more computers to create a modified second video segment, wherein the modified second video segment is comprised of fewer images than the second video segment.

12. The non-transitory computer-readable medium according to claim 9, wherein the first autoencoder and the second autoencoder are Feed Forward neural networks.

13. The non-transitory computer-readable medium according to claim 9, wherein the first autoencoder and the second autoencoder are Long-Short Term Memory neural networks.

14. The non-transitory computer-readable medium according to claim 9, wherein the first autoencoder and the second autoencoder are Convolutional neural networks.

15. The non-transitory computer-readable medium according to claim 9, wherein the shared encoder is trained using the first set of facial images and the second set of facial images.

16. The non-transitory computer-readable medium according to claim 1, wherein the video clip corresponds to a synchronized audio clip, and wherein the synthetic video segment shows a user speaking in synchronization with a portion of the audio clip.

17. A system for generating synthetic video segments for use in editing videos, the system comprising:
- a device processor; and
- a non-transitory computer readable medium storing instructions that are executable by the device processor to:
- receive a video clip comprised of a continuous video recording of a subject that is speaking, the video clip including a first timestamp and a second timestamp, wherein the first timestamp and the second timestamp define a segment of the video clip to be edited;
- segment the video clip into a first video segment, a second video segment, and a third video segment according to the first timestamp and the second timestamp, wherein the second video segment is the segment of the video clip to be edited;
- use facial recognition to identify and extract a first set of facial images from the second video segment;
- use facial recognition to identify and extract a second set of facial images from the third video segment;
- train a first autoencoder, comprised of a shared encoder and a first decoder, using the first set of facial images extracted from the second video segment;
- train a second autoencoder, comprised of the shared encoder and a second decoder, using the second set of facial images extracted from the third video segment;
- generate a set of synthetic facial images by feeding the second set of facial images into the first autoencoder; and
- superimpose the set of synthetic facial images onto images extracted from the second video segment to generate a synthetic video segment.

18. The system according to claim 17, wherein the first autoencoder and the second autoencoder are Feed Forward neural networks.

19. The system according to claim 17, wherein the first autoencoder and the second autoencoder are Long-Short Term Memory neural networks.

20. The system according to claim 17, wherein the first autoencoder and the second autoencoder are Convolutional neural networks.

* * * * *